(12) United States Patent
Vildosola et al.

(10) Patent No.: US 9,637,039 B1
(45) Date of Patent: May 2, 2017

(54) TOW BAR FOR TOWING TRUCKS

(71) Applicant: LOGISTICS AND TRANSPORTATION, LLC, Las Vegas, NV (US)

(72) Inventors: Gustavo Vildosola, San Diego, CA (US); Rodolfo Moyeda, San Diego, CA (US); Leopoldo Flores, San Diego, CA (US); Enrique Valdes, San Diego, CA (US)

(73) Assignee: Logistics and Transportation, LLC, Las Vegas, NV (US)

( * ) Notice: Subject to any disclaimer, the term of this patent is extended or adjusted under 35 U.S.C. 154(b) by 0 days.

(21) Appl. No.: 14/996,435

(22) Filed: Jan. 15, 2016

(51) Int. Cl.
*B60P 3/075* (2006.01)
*B60P 3/12* (2006.01)

(52) U.S. Cl.
CPC .............. *B60P 3/075* (2013.01); *B60P 3/125* (2013.01)

(58) Field of Classification Search
CPC .................................. B60P 3/125; B60P 3/075
See application file for complete search history.

(56) References Cited

U.S. PATENT DOCUMENTS

| 8,371,599 B2 * | 2/2013 | Duvall | B60D 1/01 280/402 |
|---|---|---|---|
| 8,622,413 B2 * | 1/2014 | Schuettenberg | B60D 1/00 280/402 |

* cited by examiner

*Primary Examiner* — Kevin Hurley
(74) *Attorney, Agent, or Firm* — John L. Rogitz

(57) ABSTRACT

A vehicle tow assembly includes an elongated, rigid upper member that attaches to a tow vehicle, and a rigid, elongated lower member that attaches, using U-bolts and/or a chain, to a vehicle to be towed. A downwardly-slanting connecting member connects the upper and lower members such that the upper member is higher off the ground than the lower member. A saddle block on the upper member can be turned one way to engage the fifth wheel of the tow vehicle and can be flipped 180 degrees to engage the frame of the tow vehicle when no fifth wheel is present.

19 Claims, 4 Drawing Sheets

TOW BAR FOR TOWING TRUCKS

TECHNICAL FIELD

The present application relates generally to tow bars for towing trucks.

BACKGROUND

A simple yet elegant system is required to tow trucks of varying sizes and configurations.

SUMMARY

Accordingly, a vehicle tow assembly includes an upper member that attaches to a tow vehicle and that is rigid and elongated. The assembly also includes a lower member that attaches to a vehicle to be towed and that is rigid and elongated. A coupling member connects the upper and lower members such that the upper member is higher than the lower member when the assembly is engaged with the tow vehicle and the vehicle to be towed.

According to this first aspect, a saddle block is coupled to the upper member. The saddle block has a fifth wheel mount defining a flat surface and a post connected to the flat surface extending away from the flat surface for engaging a fifth wheel assembly of the tow vehicle. Additionally, the saddle block has a frame mount opposed to the fifth wheel mount. The frame mount includes at least one channel configured to receive a connector to engage the frame mount, by means of the connector, to a frame of the tow vehicle. The connector may include a combination saddle that has been coupled to the tow vehicle. In any case, the saddle block has a fifth wheel position in which the flat surface faces down and the post extends into a receptacle of the fifth wheel mount when the assembly is engaged with the tow vehicle. When no fifth wheel is on the tow vehicle, the saddle mount can be flipped on the upper member to a frame position in which the flat surface faces up and the frame mount faces down.

In this first aspect, the lower member has at least one U-bolt channel configured to receive a U-bolt to couple the lower member with the vehicle to be towed. In an example, the U-bolt couples to the front axle of the vehicle to be towed. A rear end segment of the lower member has a chain opening to receive a chain to couple the rear end segment to the frame of the vehicle to be towed.

In some embodiments, a shank extends through the chain to hold the chain, and a cotter pin extends transversely through the shank to limit motion of the shank.

In example embodiments, the upper member is formed with plural through-openings extending laterally through the upper member and longitudinally separated from each other to hold one or more axles of the vehicle to be towed.

In example embodiments, the lower member is formed with plural U-bolt channels longitudinally spaced on the lower member. In such embodiments, the lower member may include a flange extending laterally away from a body of the lower member and formed with the plural U-bolt channels.

In example embodiments, no structure is telescopically engaged with the lower member.

In example embodiments, a cross-beam is positionable on the frame of the vehicle to be towed and oriented perpendicular to the lower member. The chain can be engaged with the cross-beam. The cross-beam need not be affixed to the frame when the assembly is engaged with the tow vehicle and the vehicle to be towed.

In another aspect, a vehicle tow assembly includes an upper member that attaches to a tow vehicle and that is rigid, and a lower member that attaches to a vehicle to be towed and that is rigid and coupled to the upper member. A coupling is engaged with the upper member. The coupling has a fifth wheel mount for engaging a fifth wheel assembly of the tow vehicle. Moreover, the coupling has a frame mount opposed to the fifth wheel mount to engage a frame of the tow vehicle. The coupling can be flipped on the upper member between a fifth wheel position, in which the fifth wheel mount faces down to engage the fifth wheel of the tow vehicle, and a frame position, in which the frame mount faces down to engage the frame of the tow vehicle.

In another aspect, a vehicle tow assembly includes an upper member that attaches to a tow vehicle and that is rigid and elongated, and a lower member that attaches to a vehicle to be towed and that is rigid and coupled to the upper member. At least one first connector such as but not limited to U-bolt is provided for coupling a forward segment of the lower member to the vehicle to be towed. Also, at least one second connector such as but not limited to a chain is provided for coupling a rear segment of the lower member to the vehicle to be towed.

The details of the various embodiments described herein, both as to their structure and operation, can best be understood in reference to the accompanying drawings, in which like reference numerals refer to like parts, and in which:

DETAILED DESCRIPTION

Figure 1:
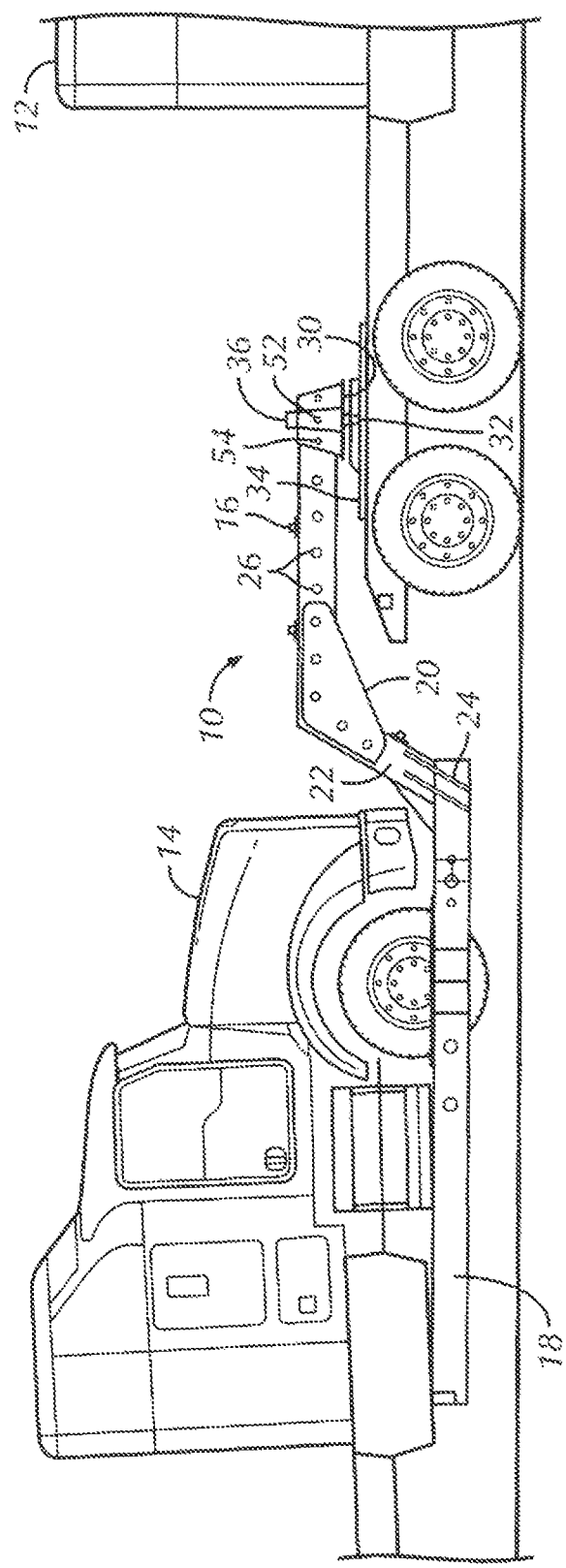
FIG. 1 is a partially schematic side view of an example of the tow assembly connecting a tow vehicle with a vehicle to be towed.

Referring initially to FIG. 1, a tow assembly 10 connects a tow vehicle 12 to a vehicle to be towed 14. In the example shown, both vehicles 12, 14 happen to be trucks.

In the example shown in FIG. 1, the two assembly 10 includes an upper member 16 that attaches to the tow vehicle 12 and that is rigid and elongated. Like the other components of the tow assembly 10, the upper member 16 may be made of metal such as steel or aluminum, although rigid hard plastic or composite material may be used. Like the other members of the tow assembly 10, the upper member 16 may be hollow or solid, and may be made by forging, casting, welding, and combinations thereof.

As also shown, the assembly 10 has a lower member 18 that attaches to the vehicle to be towed 14 and that is rigid and elongated. A downwardly-angled (from the upper member) coupling member 20 connects the upper and lower members such that the upper member 16 is higher than the lower member 18 as shown when the assembly 10 is engaged with the tow vehicle 12 and the vehicle to be towed 14. In an example, the coupling member 20 includes opposed flat bracket walls the low ends 22 of which may be reinforced with plural (in the example shown, two) strengthening ribs 24 that extend longitudinally along the low ends 22. Also, in the example shown the upper member 16 may be formed with a series of lateral through-openings 26 to receive any axle or axles of the vehicle to be towed 14 that are removed to prevent damage during towing.

Figure 2:
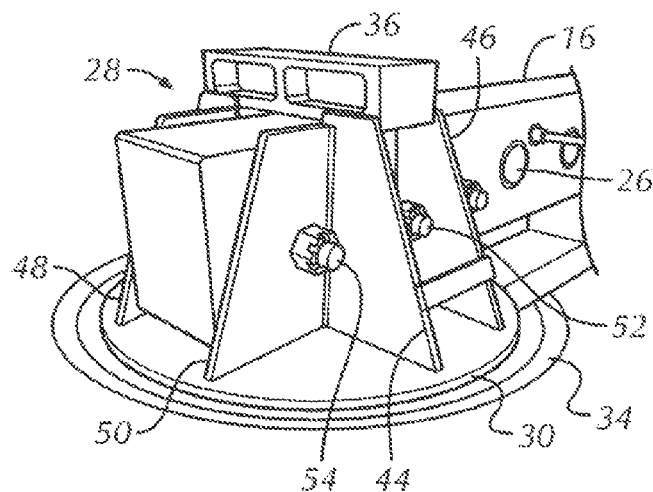
FIG. 2 is a perspective view of the saddle block in the fifth wheel position, with portions of the upper member cut away, schematically showing a portion of the fifth wheel of the tow vehicle.
Figure 3:
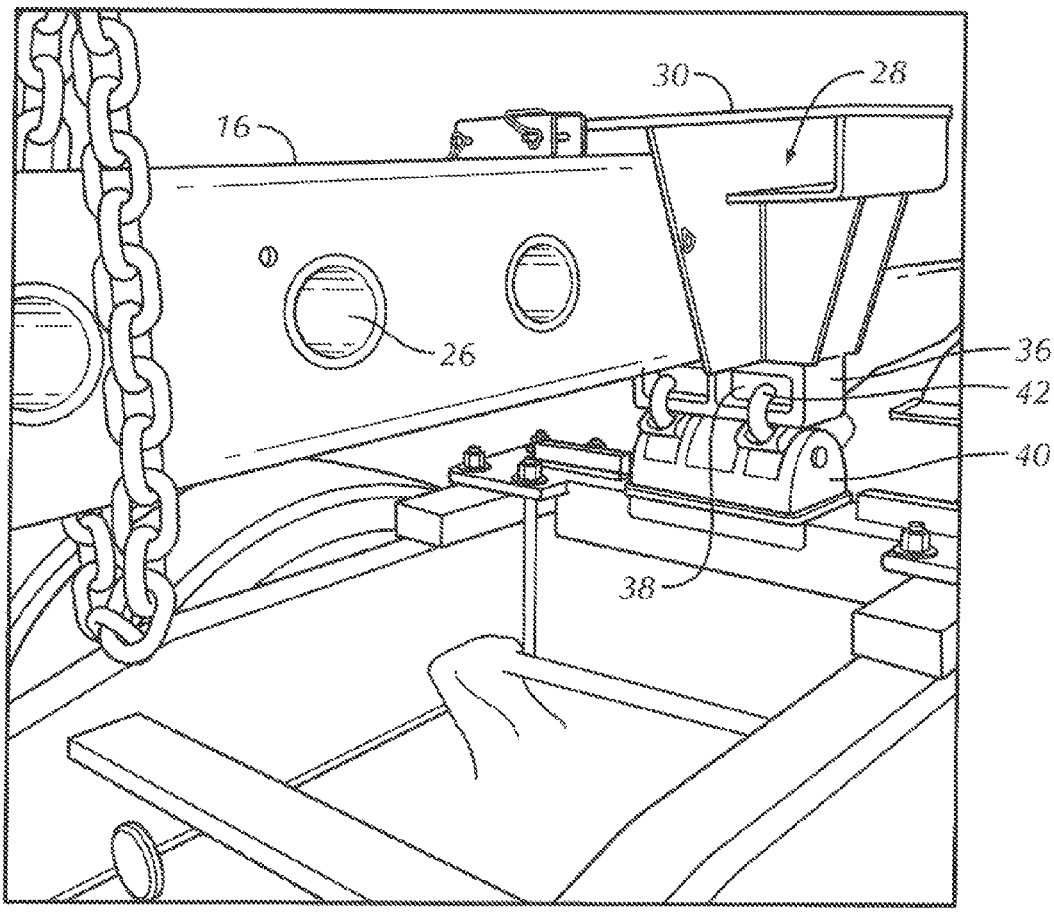
FIG. 3 is a perspective view of the saddle block in the frame position, with portions of the upper member cut away.

In cross-reference to FIGS. 1-3, a coupling such as a saddle block 28 can be coupled to the upper member 16. The example saddle block 28 shown has a fifth wheel mount defining a round (disk-shaped) flat surface 30 and a post 32 (FIG. 1) connected to the flat surface 30 and extending away from the flat surface 30 for engaging a fifth wheel assembly 34 of the tow vehicle 12.

Also, the saddle block 28 has a parallelepiped-shaped frame mount 36 opposed to the fifth wheel mount. As best shown in FIG. 2, the frame mount 36 includes at least one and preferably plural longitudinally-oriented channels 38 configured to receive a connector to engage the frame mount, by means of the connector, to a frame of the tow vehicle 12. In an example, the frame mount 36 may be coupled to a combination saddle 40 that may be installed on the frame of the tow vehicle 12 by extending couplings 42 such as U-bolts or other couplings through the channels 38 into the combination saddle 40.

Between the frame mount 36 and flat surface 30, the saddle block 28 includes front and rear brackets 44, 46 (FIG. 2) the outer edges of which slope radially inwardly as shown from the periphery of the flat surface 30 to the left and right side edges of the frame mount 36, giving the example saddle block a somewhat trapezoidal appearance when viewed from the front. Furthermore, the brackets 44, 46 extend laterally away from left and right vertical plates 48, 50 of the saddle block 28, between which parallel plates the upper member 16 is closely received as shown. The saddle block 28 thus described may be a unitary piece of metal.

An axle pin 52 extends transversely through the left and right vertical plates 48, 50 between the front and rear brackets 44, 46 of the saddle block 28 and through a lateral channel formed in the upper member 16 and registered with the pin holes in the left and right vertical plates through which the axle pin 52 extends. With this structure, the saddle block can be positioned on the upper member 16 in a fifth wheel position (FIGS. 1 and 2), in which the flat surface 30 faces down and the post 32 shown in FIG. 1 extends into a receptacle of the fifth wheel mount 34 when the assembly 10 is engaged with the tow vehicle 12.

When no fifth wheel is available, the saddle block 28 can be flipped 180° on the upper member 16 into a frame position (FIG. 3), in which the flat surface 30 faces up and the frame mount 36 faces down when the assembly is engaged with the tow vehicle. In an example, the geometry of the saddle mount 28 may be such that the saddle mount 28 can be rotated about the axle pin 52 without removing the saddle mount 28 from the upper member 16. In other examples, the saddle mount 28 may not have sufficient clearance to rotate 180° on the upper member 16, in which case to flip the saddle mount, the axle pin 52 is removed and the saddle mount 28 is slid off the front end of the upper member 16, flipped, and then slid back onto the upper member 16, reinstalling the axle pin 52.

In either case, holder pins 54 may be provided through the left and right vertical plates 48, 50 of the saddle mount 28 and through respective registered through-holes in the upper member 16 to hold the saddle mount 28 securely onto the upper member 16. Note that one holder pin may be located in front of the front bracket 44 and the other holder pin 54 may be located behind the rear bracket 46 as shown.

Figure 4:
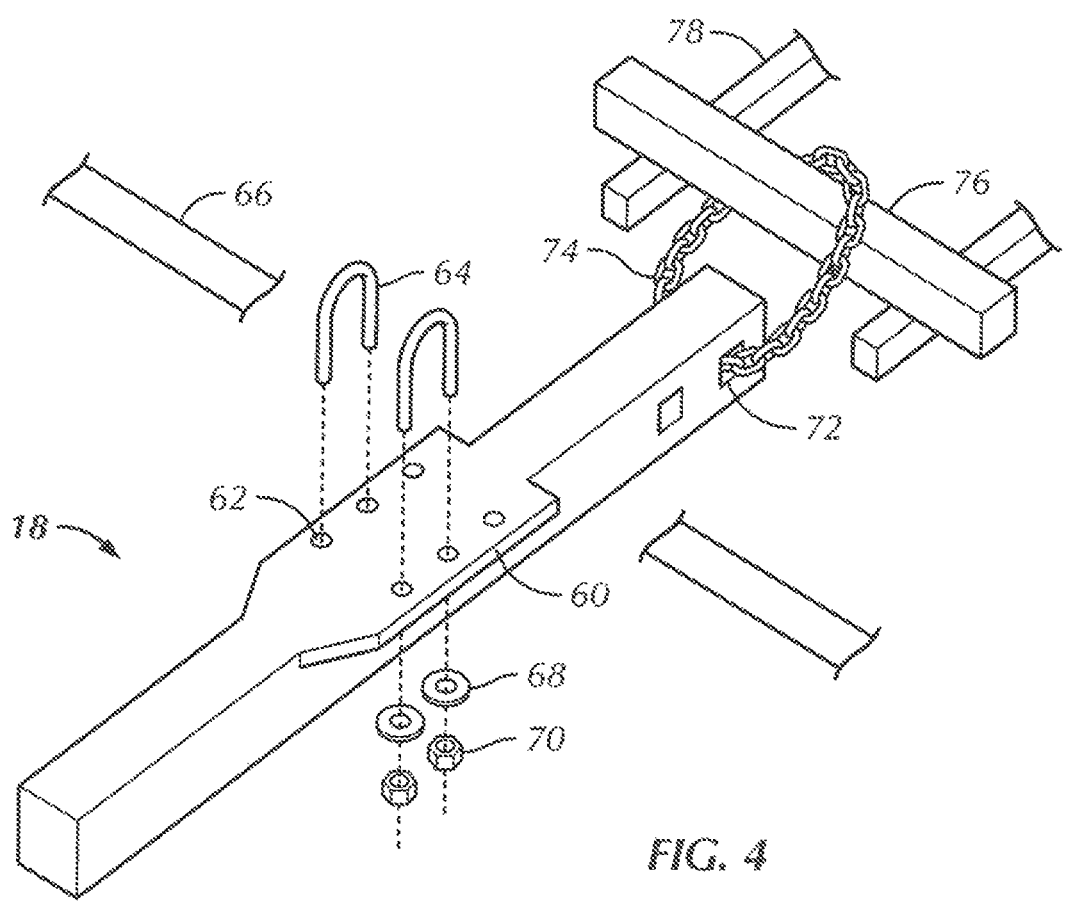
FIG. 4 is a perspective view of the lower member in an exploded relationship with the U-bolts, with portions of the front axle and frame of the vehicle to be towed cut away.
Figure 5:
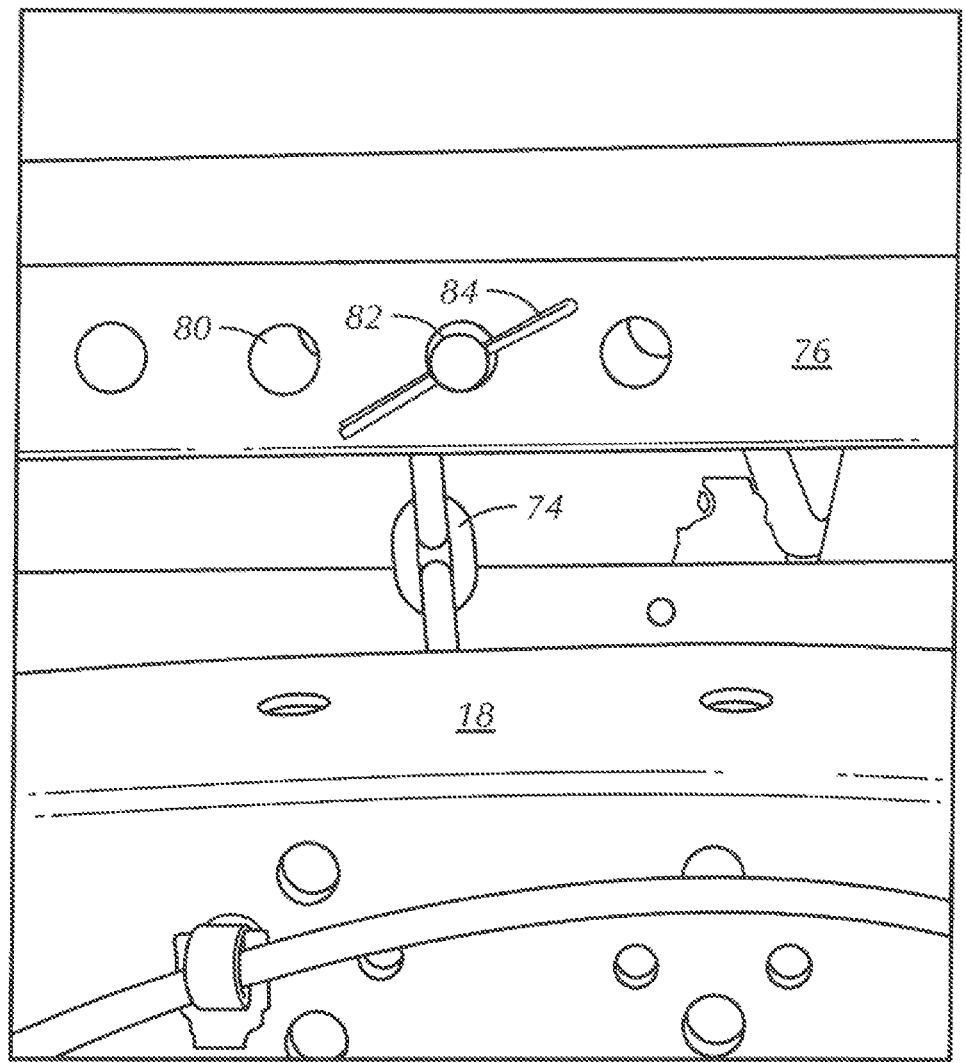
FIG. 5 is a perspective view of the cross-bar and shank with cutter pin to hold the chain.

Turning now to the details of an example lower member 18 and FIGS. 4 and 5, the lower member 18 may have an elongated generally parallelepiped-shaped forward segment on the top of which are two flat laterally-extending brackets 60 that extend laterally beyond the rectangular bar of the lower member 18, each with a series of longitudinally-spaced channels 62 as shown. The forward and back ends of one or more U-bolts 64 may be received through successive longitudinally-spaced channels 62 along the left or right part of the brackets 60 to couple the lower member 18 with the vehicle to be towed 14 in accordance with the following description. Note that when the U-bolt(s) 64 are so oriented (i.e., with the ends of the U-bolt defining a line that is parallel to the long axis of the lower member), they are oriented to receive a transversely-oriented portion of the vehicle to be towed 14, such as the front axle 66.

Note further that in the example shown, no structure need be telescopically engaged longitudinally with the lower member 18, since aspects described herein obviate the need to adjust the length of the lower member 18 for the vehicle to be towed 14.

It is to be understood that in some configurations of the two flat laterally-extending brackets 60 and transverse spacings between the channels 62, the U-bolts alternatively may be oriented with the ends of the U-bolt defining a line that is transverse to the long axis of the lower member 18. In this arrangement, the respective ends of the U-bolts pass through a channel 62 in the left part of the brackets 60 and a channel 62 in the right part of the bracket to orient the U-bolts to receive a part of the vehicle to be towed that is parallel to the long axis of the lower member 18.

To hold the front segment of the lower member essentially suspended from the front axle 66, once the ends of the U-bolts have been passed through the channels 62, stoppers 68 such as large washers are slide onto the ends of the U-bolts and secured with, e.g., nuts 70 that may be threadably engaged with the U-bolts 64.

As understood herein, it may also be necessary to secure the rearmost portion of the lower member 18 to the frame of the vehicle to be towed. To this end, a rear end segment of the lower member 18 may have one or more chain openings 72 formed transversely through the lower member 18 as shown to receive a connector such as a chain 74. The chain 74 couples the rear end segment to the frame of the vehicle to be towed.

In FIGS. 4 and 5, a cross-beam 76 is positioned on supporting portions 78 of the frame of the vehicle to be towed. The cross-beam 76 can be oriented perpendicular to the lower member 18 (FIG. 4) or parallel to it (FIG. 5), but in either case, the chain 74 is engaged with the cross-beam 76. Note that the cross-beam 76 can be temporary and thus need not be affixed to the frame of the vehicle to be towed. In other embodiments no separate cross-beam is used and the chain is simply wrapped around a portion of the vehicle frame.

Regardless, the chain 74 can extend around the top part of the cross-beam 76 or it can be disposed through a hole in a hollow cross-beam and thus lie within the cross-beam. In either case, the cross-beam 76 may be formed with a transversely-arrayed series of shank holes 80 to receive a rigid cylindrical shank 82 into one of the holes, with the shank 82 also extending through one or more links of the chain 74. A cotter pin 84 may extend transversely through an end of the shank 82 to limit motion of the shank. With this structure, the connection between the chain 74 and cross-beam 76 is made more secure.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

While various embodiments are herein shown and described in detail, the scope of the present invention is to be limited by nothing other than the appended claims.

What is claimed is:

1. A vehicle tow assembly, comprising:
an upper member that attaches to a tow vehicle and that is rigid and elongated;
a lower member that attaches to a vehicle to be towed and that is rigid and elongated;
a coupling member connecting the upper and lower members such that the upper member is higher than the lower member when the assembly is engaged with the tow vehicle and the vehicle to be towed;
a saddle block coupled to the upper member, the saddle block having a fifth wheel mount defining a flat surface and a post connected to the flat surface extending away from the flat surface for engaging a fifth wheel assembly of the tow vehicle, the saddle block having a frame mount opposed to the fifth wheel mount, the frame mount including at least one channel configured to receive a connector to engage the frame mount, by means of the connector, to a frame of the tow vehicle, the saddle block having a fifth wheel position in which the flat surface faces down and the post extends into a receptacle of the fifth wheel mount when the assembly is engaged with the tow vehicle, the saddle block having a frame position in which the flat surface faces up and the frame mount faces down when the assembly is engaged with the tow vehicle;
the lower member having at least one U-bolt channel configured to receive a U-bolt to couple the lower member with the vehicle to be towed, a rear end segment of the lower member having a chain opening to receive a chain to couple the rear end segment to a frame of the vehicle to be towed.

2. The assembly of claim 1, comprising a shank extending through the chain to hold the chain and a cotter pin extending transversely through the shank to limit motion of the shank.

3. The assembly of claim 1, wherein the upper member is formed with plural through-openings extending laterally through the upper member and longitudinally separated from each other to hold one or more axles of the vehicle to be towed.

4. The assembly of claim 1, wherein the lower member is formed with plural U-bolt channels longitudinally spaced on the lower member.

5. The assembly of claim 1, comprising the U-bolt engaged with the lower member.

6. The assembly of claim 1, wherein no structure is telescopically engaged with the lower member.

7. The assembly of claim 4, wherein the lower member includes a flange extending laterally away from a body of the lower member and formed with the plural U-bolt channels.

8. The assembly of claim 1, comprising a cross-beam positionable on the frame of the vehicle to be towed, the chain being engageable with the cross-beam, the cross-beam not being affixed to the frame when the assembly is engaged with the tow vehicle and the vehicle to be towed.

9. A vehicle tow assembly, comprising:
an upper member that attaches to a tow vehicle and that is rigid;
a lower member that attaches to a vehicle to be towed and that is rigid, the lower member being coupled to the upper member;
a coupling engaged with the upper member, the coupling having a fifth wheel mount for engaging a fifth wheel assembly of the tow vehicle, the coupling having a frame mount opposed to the fifth wheel mount to engage a frame of the tow vehicle, the coupling having a fifth wheel position in which the fifth wheel mount faces down when the assembly is engaged with the tow vehicle, the coupling having a frame position in which the frame mount faces down when the assembly is engaged with the tow vehicle.

10. The assembly of claim 9, wherein the fifth wheel mount defines a flat surface and a post connected to the flat surface extending away from the flat surface.

11. The assembly of claim 9, wherein the upper member is formed with plural through-openings extending laterally through the upper member and longitudinally separated from each other to hold one or more axles of the vehicle to be towed.

12. The assembly of claim 9, wherein the lower member has at least one U-bolt channel configured to receive a U-bolt to couple lower member with the vehicle to be towed, a rear end segment of the lower member having a chain opening to receive a chain to couple the rear end segment to a frame of the vehicle to be towed.

13. The assembly of claim 9, wherein the lower member is formed with plural U-bolt channels longitudinally spaced on the lower member.

14. The assembly of claim 12, comprising the U-bolt engaged with the lower member.

15. The assembly of claim 9, wherein no structure is telescopically engaged with the lower member.

16. The assembly of claim 13, wherein the lower member includes a flange extending laterally away from an elongated body of the lower member and formed with the plural U-bolt channels.

17. A vehicle tow assembly, comprising:
an upper member that attaches to a tow vehicle and that is rigid;
a lower member that attaches to a vehicle to be towed and that is rigid, the lower member being coupled to the upper member;
at least a first connector for coupling a forward segment of the lower member to the vehicle to be towed; and
at least a second connector for coupling a rear segment of the lower member to the vehicle to be towed, wherein the first connector includes at least one U-bolt and the second connector includes at least one chain.

18. The assembly of claim 17, wherein the lower member includes a flange extending laterally away from an elongated body of the lower member and formed with plural channels for receiving the first connector.

19. A vehicle tow assembly, comprising:
an upper member that attaches to a tow vehicle and that is rigid;

a lower member that attaches to a vehicle to be towed and that is rigid, the lower member being coupled to the upper member;
at least a first connector for coupling a forward segment of the lower member to the vehicle to be towed; and
at least a second connector for coupling a rear segment of the lower member to the vehicle to be towed; and
a cross-beam positionable on the frame of the vehicle to be towed and oriented perpendicular to the lower member, the second connector being engageable with the cross-beam, the cross-beam not being affixed to the frame when the assembly is engaged with the tow vehicle and the vehicle to be towed.

\* \* \* \* \*